US007283911B2

(12) United States Patent
Fitzsimmons et al.

(10) Patent No.: US 7,283,911 B2
(45) Date of Patent: Oct. 16, 2007

(54) SYSTEM AND METHOD FOR INTERPRETING REVERSE FAULTS AND MULTIPLE Z-VALUED SEISMIC HORIZONS

(75) Inventors: Clark Fitzsimmons, Denver, CO (US); Thomas R. (Dutch) Thompson, Centennial, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 10/971,889

(22) Filed: Oct. 22, 2004

(65) Prior Publication Data

US 2006/0089806 A1   Apr. 27, 2006

(51) Int. Cl.
*G01V 1/00*   (2006.01)
(52) U.S. Cl. .......................................... 702/14; 367/73
(58) Field of Classification Search ................... 702/14, 702/16, 11, 13; 367/72, 48, 73; 703/10
See application file for complete search history.

(56) References Cited

U.S. PATENT DOCUMENTS

| 5,056,066 A | | 10/1991 | Howard ........................ 367/72 |
| 5,153,858 A | | 10/1992 | Hildebrand ................... 367/72 |
| 5,251,184 A | | 10/1993 | Hildebrand et al. .......... 367/72 |
| 5,432,751 A | | 7/1995 | Hildebrand ................... 367/72 |
| 5,563,949 A | | 10/1996 | Bahorich et al. ............. 702/16 |
| 5,615,171 A | | 3/1997 | Hildebrand ................... 367/72 |
| 5,724,309 A | | 3/1998 | Higgs et al. ................... 367/48 |
| 5,740,342 A | * | 4/1998 | Kocberber .................... 345/420 |
| 5,982,707 A | * | 11/1999 | Abbott ........................ 367/53 |
| 6,014,343 A | * | 1/2000 | Graf et al. ..................... 367/38 |
| 6,138,076 A | * | 10/2000 | Graf et al. ..................... 702/14 |
| 6,757,615 B2 | * | 6/2004 | Zauderer et al. .............. 702/14 |
| 6,850,845 B2 | * | 2/2005 | Stark ............................ 702/16 |
| 6,853,922 B2 | * | 2/2005 | Stark ............................ 702/14 |
| 7,013,218 B2 | | 3/2005 | Baker, III et al. |
| 2004/0193960 A1 | * | 9/2004 | Vassilev ....................... 714/38 |

OTHER PUBLICATIONS

Chambers et al., Geologic Modeling, Upsacling and Simulation of Faulted Reservoirs Using Faulted Stratigraphic Grids, 1999, SPE 51889.*

(Continued)

*Primary Examiner*—Donald E. McElheny Jr.
*Assistant Examiner*—Toan M. Le
(74) *Attorney, Agent, or Firm*—Crain, Caton & James

(57) ABSTRACT

A system and method for interpreting reverse faults and multiple z-valued seismic horizons. A platform executable on a computer is provided for interpreting seismic data. The platform includes a user input module for accepting user inputs related to interpretation of seismic data and also includes a graphics processing module for displaying to a user graphics related to seismic data. A reverse fault module is provided for enforcing rules governing acceptable multi-z horizon picks. Such rules allow a multiple z-valued horizon to be interpreted as a single horizon. The invention further includes methods for allowing a user to interpret seismic data in a reverse-fault environment. An interpretation of seismic data is displayed and reverse faults and multiple z-valued horizons are created and displayed within the interpretation. A set of reverse-fault environment properties is associated with the reverse faults and the multiple z-valued horizons.

57 Claims, 11 Drawing Sheets

OTHER PUBLICATIONS

Krass, Valerie, "What's New In GeoGraphix Discovery R2003.1—Geological and Geophysical Interpretation," Technical Newsletter for Landmark Users, Apr. 2003, pp. 1-12.

SeisVision 8.5 Help website excerpts for Geographix Discovery 2003.1 Release in Aug. 2003.

Titles and Abstracts for materials presented to the Society of Exploration Geophysicists in Dallas on Oct. 24, 2003.

A Guide to the Menus and Functions of the Oasiis Open Architecture Seismic Integrated Interpretation System; Oasiis Reference Guide; Nov. 1996; vol. 1 & 2; pp. 1-996; Landmark Graphics Corporation, Houston, Texas USA.

Real-Time prestack Interpretation Workstartion; Integrated Seismic and Geological Analysis, Modeling, Mapping, Mapping, Prestack AVO and Visualization Software; Genetek Earth Research; Internet article; about 2003; pp. 1-8; Published on the internet @www.genetek.com.

Seismic Interpretation; Brochure; about 2003; pp. 1-2 Published @www.earthdecision.com and www.paradigmgeo.com.

GeoSec 3D; 3D Model Construction, Restoration and Balancing; Brochure; 2003; pp. 1-6; Published by Paradigm.

Geoshare Data Model; Internet Article; 2005; pp. 1-7; Version 13.0; Published on the Internet @http://w3.posc.org/GeoshareSIG/technical/GDM/v13.0/217-GRID.php.

Geoshare Data Model; Specification; Feb. 25, 1992; pp. 1-24; Version 2.0; Published by Finder Graphics Systems, Inc., Geoquest Systems, Inc. and Schlumberger Technology Corporation.

Charisma; 2007; p.1; Published @http://www.slb.com/content/services/software/geo/geoframe/geophysics/charisma.asp.

* cited by examiner

SYSTEM AND METHOD FOR INTERPRETING REVERSE FAULTS AND MULTIPLE Z-VALUED SEISMIC HORIZONS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to the field of computer-aided exploration for hydrocarbons using seismic data of the earth. More particularly, the present invention provides systems and methods for interpreting reverse faults and multiple z-valued seismic horizons.

BACKGROUND OF THE INVENTION

The use of seismic data to analyze subsurface geological structures, such as faults or other stratigraphic features, is becoming increasingly more important to interpreters. For example, seismic data is commonly being employed to identify faults to facilitate the location of hydrocarbon reservoirs. In this way, wells may more accurately be positioned to facilitate hydrocarbon recovery.

As computer technology continues to advance, the use of computers to process seismic data is becoming widespread. As such, methods for obtaining seismic data and inputting such data into computer work-stations are well known in the art. For example, such techniques are described in U.S. Pat. Nos. 5,563,949 and 5,724,309.

Once the seismic data is input into the computer workstation, the data must be processed and analyzed to produce a meaningful output. Because of the usefulness of the seismic data, many in the oil industry are now searching for effective ways to analyze the data to produce an accurate delineation of faults or stratigraphic features. As one example, Landmark Graphics Corporation's SeisVision™ platform is a seismic analysis application well-known in the art.

Although some software does exist to process and analyze seismic data, improvements are still needed. For example, no existing seismic interpretation packages include direct support for working in thrust/reverse faulted environments. Thus, interpreters currently are resigned to a cumbersome approach that requires several horizons to represent what is truly just one event. In addition, the current systems force geoscientists to accept the terminology of normal faults when they are dealing with quite different geometries; normal faults produce gaps in horizons called fault polygons, while reverse faults have areas of repeated section.

Hence, it would be desirable to provide improved methods and apparatus for processing and analyzing seismic data. Such methods and apparatus should include direct support for working in thrust/reverse faulted environments and should provide an efficient user interface for dealing with such data.

SUMMARY OF THE INVENTION

The present invention meets the above needs and overcomes one or more deficiencies in the prior art by providing a system and method for interpreting reverse faults and multiple z-valued seismic horizons. In one aspect of the present invention, a platform executable on a computer is provided for interpreting seismic data. The platform includes a user input module for accepting user inputs related to interpretation of seismic data and also includes a graphics processing module for displaying to a user graphics related to seismic data. A reverse fault module is provided for enforcing rules governing acceptable multi-z horizon picks. Such rules allow a multiple z-valued horizon to be interpreted as a single horizon.

Another aspect of the present invention includes a computerized method for validation of horizons picks having z-values separated by reverse faults. The method provides seismic traces with one or more selected z-values. From these selected z-values, one or more picks are accepted. The accepted picks include picks separated from each other selected z-value on a trace by a reverse fault. The accepted picks are then connected such that the connections do not intersect the reverse faults.

In yet another aspect of the present invention, a computerized method for allowing a user to interpret seismic data in a reverse-fault environment is included. An interpretation of seismic data is displayed and reverse faults and multiple z-valued horizons are created and displayed within the interpretation. A set of reverse-fault environment properties is associated with the reverse faults and the multiple z-valued horizons.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The present invention provides an improved system and method for analyzing seismic data. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications networks. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
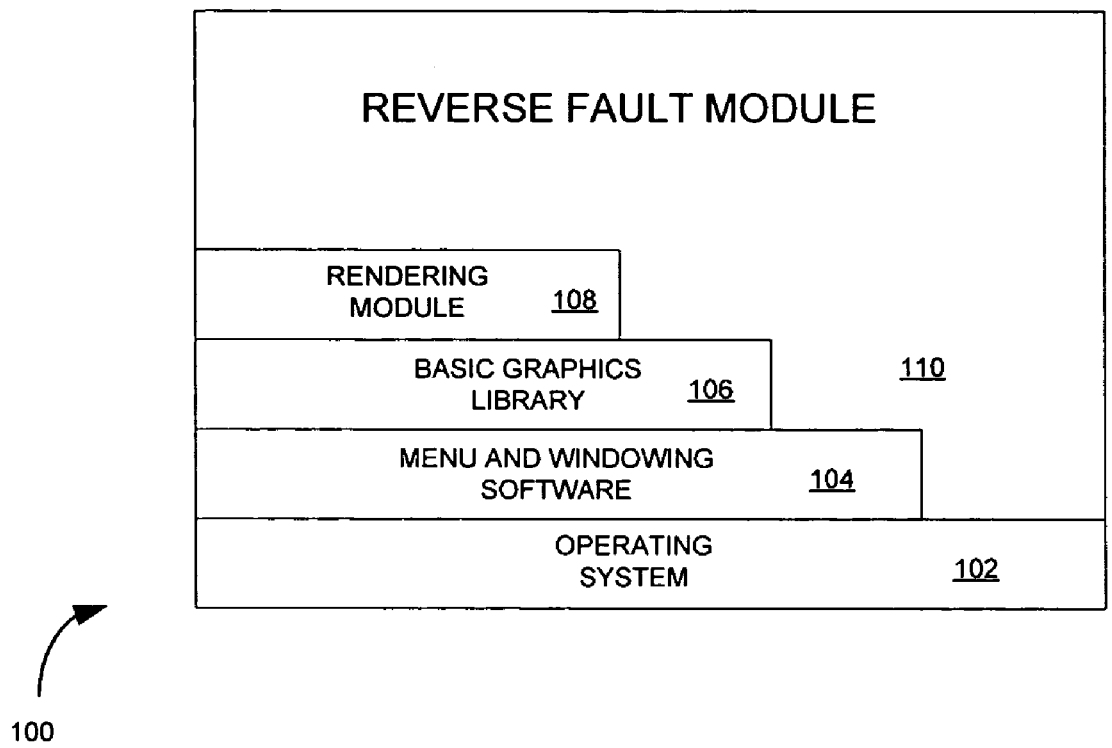
FIG. 1 is a schematic diagram representing a program structure for implementing an embodiment of the present invention.

As previously mentioned, the present invention provides systems and methods for interpreting reverse faults and multiple z-valued seismic horizons. The present invention may be implemented using hardware, software or a combination thereof, and may be implemented in a computer system or other processing system. One embodiment of a software or program structure 100 for implementing the present invention is shown in FIG. 1. At the base of program structure 100 is an operating system 102. A suitable operating system 102 includes, for example, a Windows® operating system from Microsoft Corporation, or other operating systems as would be apparent to one of skill in the relevant art.

Menu and windowing software 104 overlays operating system 102. Menu and windowing software 104 are used to provide various menus and windows to facilitate interaction with the user, and to obtain user input and instructions. As would be readily apparent to one of skill in the relevant art, any number of menu and windowing software programs could be used in conjunction with the present invention.

A basic graphics library 106 overlays the menu and windowing software 104. Basic graphics library 106 is an application programming interface (API) for computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, feedback and selection, stencil planes, and accumulation buffer.

Seismic rendering application 108 overlays basic graphics library 106. As will be understood by those skilled in the art, seismic rendering application 108 may include a suite of tools for 2D/3D time and depth interpretations, including interactive horizon and fault management, 3D visualization, and attribute analysis. For example, Landmark Graphics Corporation's SeisVision™ platform is a seismic rendering application appropriate for use with the present invention.

Overlaying the other elements of program structure 100 is a reverse fault module 110. Module 110 is configured to interact with seismic data representing multiple z-horizons and reverse faults. As will be understood by those skilled in the art, in order to support multiple z-horizons and reverse faults, module 110 will have a variety of functionalities, including performing methods in accordance with the present invention, described supra.

Figure 2:
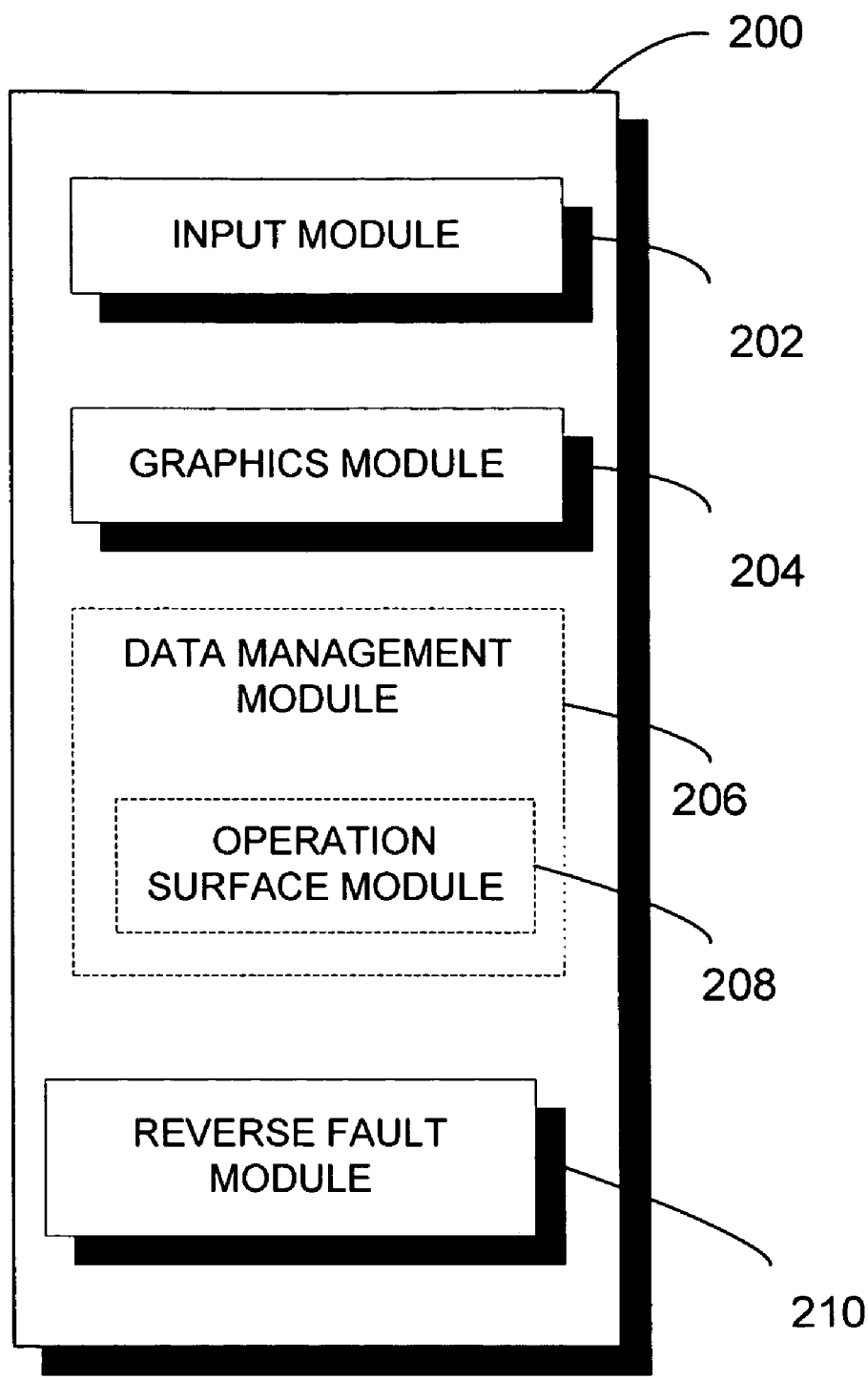
FIG. 2 is a block diagram of a program platform for implementing an embodiment of the present invention.

FIG. 2 displays program platform 200 for implementing the present invention. As will be understood by those skilled in the art, platform 200 may be utilized to interpret seismic data and may include a variety of modules. An input module 202 may accept user inputs via a variety of input means. For example, input module 202 may accept user inputs from menus to load seismic data or create reverse faults and multi-z horizons, or module 202 may accept mouse inputs for reverse fault and multi-z horizon interpretation. Those skilled in the art will recognize that a wide variety of inputs may be received by module 202.

Platform 200 may further include a graphics module 204. Any number of well-known graphic technologies are acceptable for use with the present invention. The graphics module 204 may receive user inputs from input module 202 and translate the inputs into seismic interpretation requests. Also, the graphics module 204 may display seismic, reverse faults, multi z-valued horizons, fault polylines, and any number of other graphical seismic representations to a user.

A data management module 206 may also be included as part of platform 200. This module may load data such as seismic data, reverse faults, and multi z-valued horizons from storage. The data management module 206 may also create reverse faults, multi z-valued horizons objects and files for storage or utilization. The module 206 may include a sub-module, operation surface module 208. As will be understood by those skilled in the art, module 208 may include functionality retrieve requested views of seismic features. Such functionality is well known in the art. In the case of reverse faults, for example, module 208 may retrieve single z-valued views of multi z-valued horizons components and manage fault blocks associated with faults. As will be further appreciated by those skilled in the art, any number of requested views may be retrieved by module 208 in connection with a seismic interpretation.

Platform 200 also includes reverse fault module 210. The module 210 may be configured to assist in the analysis of reverse fault environments and to enforce rules governing acceptable multi-z horizon picks. As will be understood by those skilled in the art, a seismic trace is a discrete-time signal. It is a record of the motion of the ground at one location on the earth with respect to time after a source event. More abstractly, a trace may be considered a time-series, where the dependent variable is anything of interest to the interpreter. Traces usually come bundled in collections, either two-dimensional poly-lines or three-dimensional cubes. A pick is the set of z-values on a trace that belong to a horizon. Horizons, in turn, are collections of picks that have some meaning to an interpreter. Horizons that exist in reverse fault environments will behave differently than other formations.

Accordingly, reverse fault module 210 includes the functionality to properly interpret reverse fault environments. Those skilled in the art will recognize that any number of rules may govern multi-z horizon picks in accordance with the present invention. For example, the set of rules may dictate that a multiple z-value horizon must be interpreted as a single horizon. Because reverse faults are truly a single event, interpreters may find multiple z-value horizons to be a useful interpretation for a reverse fault environment. As will be subsequently discussed, once reverse fault module 210 has interpreted a reverse fault environment, any variety of well-known operations may be applied to the interpretation. As with other outputs of platform 200, the user may analyze and interact with the data via a variety of workflows and with a variety of tool.

Figure 3:
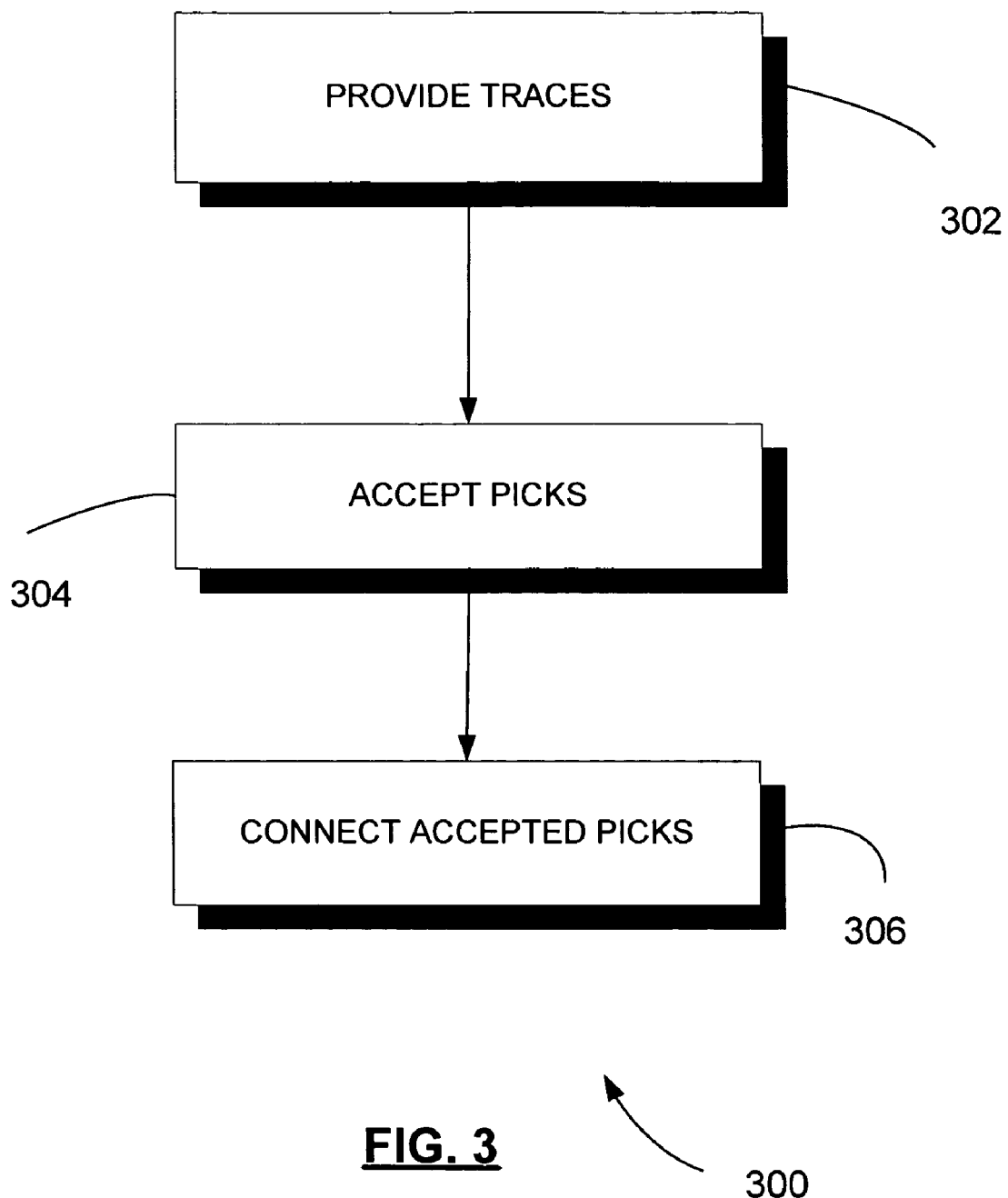
FIG. 3 is a flow diagram showing a method for validating horizon picks in a reverse fault environment in accordance with one embodiment of the present invention.

FIG. 3 provides a method 300 in accordance with the present invention for validating horizon picks in a reverse fault environment. At 302, a plurality of seismic traces is provided. Each of these traces may have one or more selected z-values. For example, a set of picks associated with a horizon of interest may be included in the selected z-values.

At 304, one or more picks are accepted from the selected z-values. As will be understood by those skilled in the art, any number pick selection algorithms may be appropriate for the present invention, and such algorithms may be developed for various geophysical features such as reverse faults. For example, one embodiment of the present invention selects picks that are separated from each other z-value on a trace by at least one reverse fault. Stated another way, this 1-D reverse fault cut detection algorithm states that, for each trace, a z-value may be added to the pick only if it separated from other z-values by a reverse fault cut.

Figure 4A:
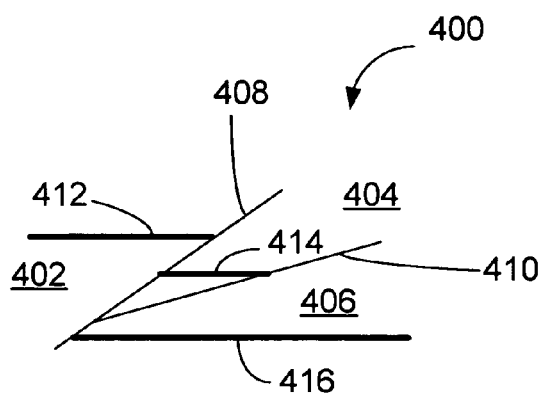
FIGS. 4A–4C are schematic diagrams showing the 1-D cut rule's behavior when fault segments are removed from a fault block.
Figure 4B:
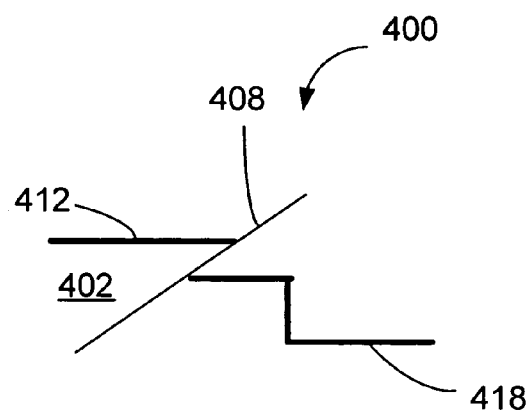
Figure 4C:
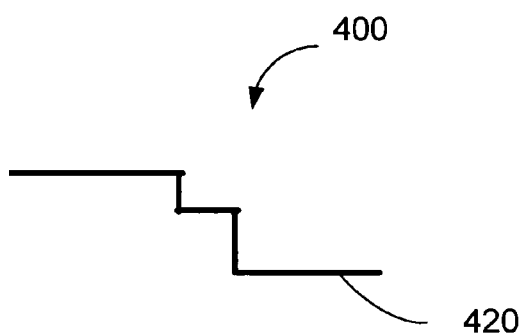

To illustrate this rule, FIGS. 4A–4C show the 1-D cut rule's behavior when fault segments are removed from a fault block 400. As shown in these figures, for each fault zone, the shallowest z-value is always the one retained. FIG. 4A includes zones 402, 404, and 406. These zones are separated by reverse faults 408 and 410. The fault block 400 also includes horizon segments 412, 414, and 416. FIG. 4B demonstrates the effect of the rule when zones 404 and 406 are combined by removing fault 410. As shown by segment 418, only the shallowest z-values are retained. Similarly in FIG. 4C, segment 420 only retains the shallowest z-values.

According to one embodiment, to carry out the 1-D reverse fault cut detection algorithm, the fault cuts must be calculated, and such computation may be made by a variety of techniques well known in the art. For each trace, the fault cuts are determined by computing the intersections between a two point vertical segment that is constructed from the trace's coordinates and extending the entire vertical dimension of the survey and the reverse fault segments. These segments may be user-defined or interpolated. As will be realized by those skilled in the art, since the test is 1-D, the orientation of the plane used to compute the interpolated fault segments is not important, while in 2D horizon picking, the current seismic section will be this plane because the fault segments are pre-computed. Considering the frequency of changes that will occur during an interpretation, various embodiments of the present invention validate horizon picks frequently to keep the fault cuts synchronized with the horizon picks.

In one embodiment of the present invention, the 1-D fault cut test is added to the primary pick access entry points. While the speed of this test may be important, it may be accomplished by computing the fault cuts on a trace-by-trace basis and, further, by storing the actual fault cut z-values for each trace in an array. The algorithm first updates fault segment intersections. Then, for each reverse fault segment, it interpolates the z-value at discrete trace indices along the segments course and updates fault segment intersections. The z-values are sorted for each trace in ascending order. As will be appreciated by those skilled in the art, this algorithm avoids having to compute all the intersections for each fault segment on each trace segment. In computational terms, computing the intersection between two segments is fairly expensive, requiring a number of multiplications, several comparisons, and time-consuming divisions. Since the fault traces are simple polylines, a quick test to see if the trace falls within the fault segment may be first performed. If the two intersect, the intersection point is just a ratio, completed quickly via a linear interpolation. This test may greatly cut the computation time.

The present invention may store both a fault cut's numeric z-value and source fault trace (which links back to the parent fault). In one embodiment, the fault cut storage structure may be designed to facilitate fast 1-D cut validation. For example, for each z-value in a pick, a binary search for the segment index of z-values in a fault cut array may be performed. If the current segment index equals the previous segment index, the test fails and the current z-value is removed from the pick. This binary search supplies the rule of removal—the deeper z-value in the fault cut segment is removed. As will be appreciated by those skilled in the art, the foregoing implementation of the 1-D reverse fault cut detection algorithm is provided merely as an example, and any number of algorithms, implementations and optimizations are appropriate for the present invention.

Figure 5:
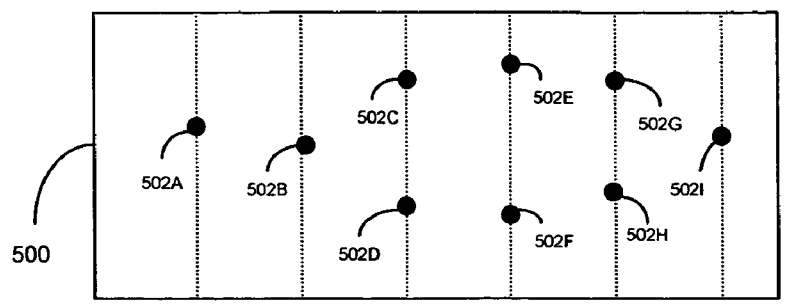
FIGS. 5–7 are schematic diagrams illustrating the nature of the reverse fault connectivity problem addressed by one embodiment of the present invention.

Returning to FIG. 3, once picks are accepted, at 306, the method 300 connects the accepted picks. Such connections may be made in accordance with a variety of connectivity algorithms. As will be appreciated by those skilled in the art, when analyzing reverse faults seismic data, connectivity is an important issue. When dealing with a single z-valued horizon, connections are not a concern; if a trace has a z-value, it is simply connected to its nearest neighbors. Multiple z-valued horizons do not afford this luxury; the horizons are logically separated into repeated sections that must be handled. To illustrate this, consider FIG. 5. This figure shows a vertical seismic section 500. Within section 500, a set of z-values is shown represented as dots 502A–502I. Without additional information, there is no way of knowing how to connect these z-values for display or other uses. It should be noted that method 300 may address connectivity problems in three dimensions as well. Instead of connecting picks, in 3-D, the present invention connects segments that describe contiguous, non-faulted blocks.

One embodiment of the present invention utilizes a 2D horizon connectivity algorithm to connect the accepted picks. This algorithm may be used to characterize the fault blocks of a horizon severed by reverse faults. As known to those skilled in the art, fault blocks are single z-valued surfaces bounded by reverse fault cuts or the survey boundaries. Once delineated, a fault block can be saved as a new horizon or a surface. Accordingly, a 2D horizon connectivity algorithm may also determine how to connect multi-z horizons for display on vertical sections. The connectivity problem is two-dimensional, and, to build the connections, the algorithm must 'walk' the traces.

Figure 6:
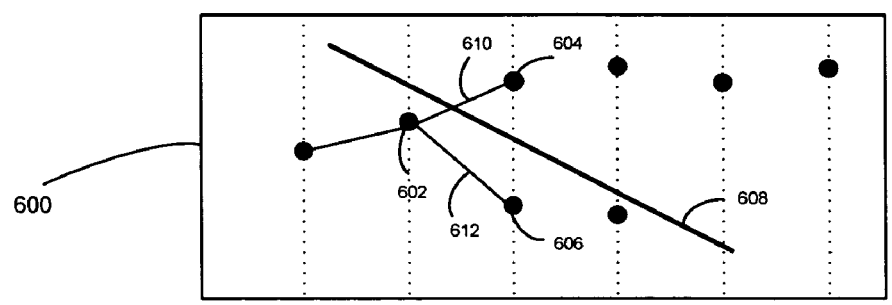

FIG. 6 is a diagram that further illustrates the nature of the connectivity problem. For a plane 600, the question is how to connect the z-values 602, 604, and 606. If we simply extend the time of z-value 602 to the next trace, we would be on the opposite side of a reverse fault cut 608 and the subsequent connection of z-values 602 and 606 would be incorrect. Therefore, to achieve the proper connections, we must first construct the line segments 610 and 612 and test these for intersections with the plane 600's reverse fault segments. In this example, segment 612 is clearly correct, because it does not cross fault boundary 608. As will be appreciated by one skilled in the art, utilizing a 1-D fault cut rule may permit optimization; when building components, the algorithm may only test for intersections with the two z-values on the adjacent trace that bound the seed z-value. Any additional z-values on the pending trace will be separated from the others by a fault cut, so the seed pick must cross these faults as well.

Figure 7:
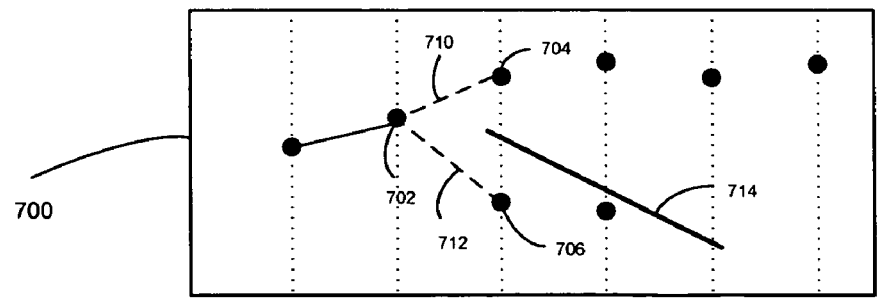

FIG. 7 is a diagram that illustrates another example of a 2D connectivity algorithm. For a plane 700, the goal is to achieve the proper connections between z-values 702, 704, and 706. The 1-D fault cut rule is not violated in this example, but the segment intersection scheme shown in FIG. 6 will fail. If this case occurs, the algorithm may split the trace into separate components. The algorithm may dictate that, from seed point 702, the closest z-values be identified. If a trace has no such z-values, then that list will end. In this example, such values do exist (i.e., points 704 and 706), so line segments 710 and 712 are constructed. Next, intersections between segments 710 and 712 and reverse fault 714 are computed. If only one segment were present, it would be tested for crossing the reverse fault 714, and, if it crossed, seed point 702's list would die. Otherwise, if it did not cross, the segment would be added to the trace. When two segments are present, as in FIG. 7, if one segment intersects with the fault, then the other endpoint is added to the current list. If both segments intersect with the fault, the current list terminates and two new lists are started. Finally, as shown by plane 700, if no crossings of segments and reverse faults exist, the current list terminates and two new lists are started. Hence segments 710 and 712 are disregarded, and points 704 and 706 become new seed points upon which the algorithm is repeated. As shown in these exemplary scenarios, the connectivity algorithms dictate that the connections do not intersect the reverse faults.

Figure 8:
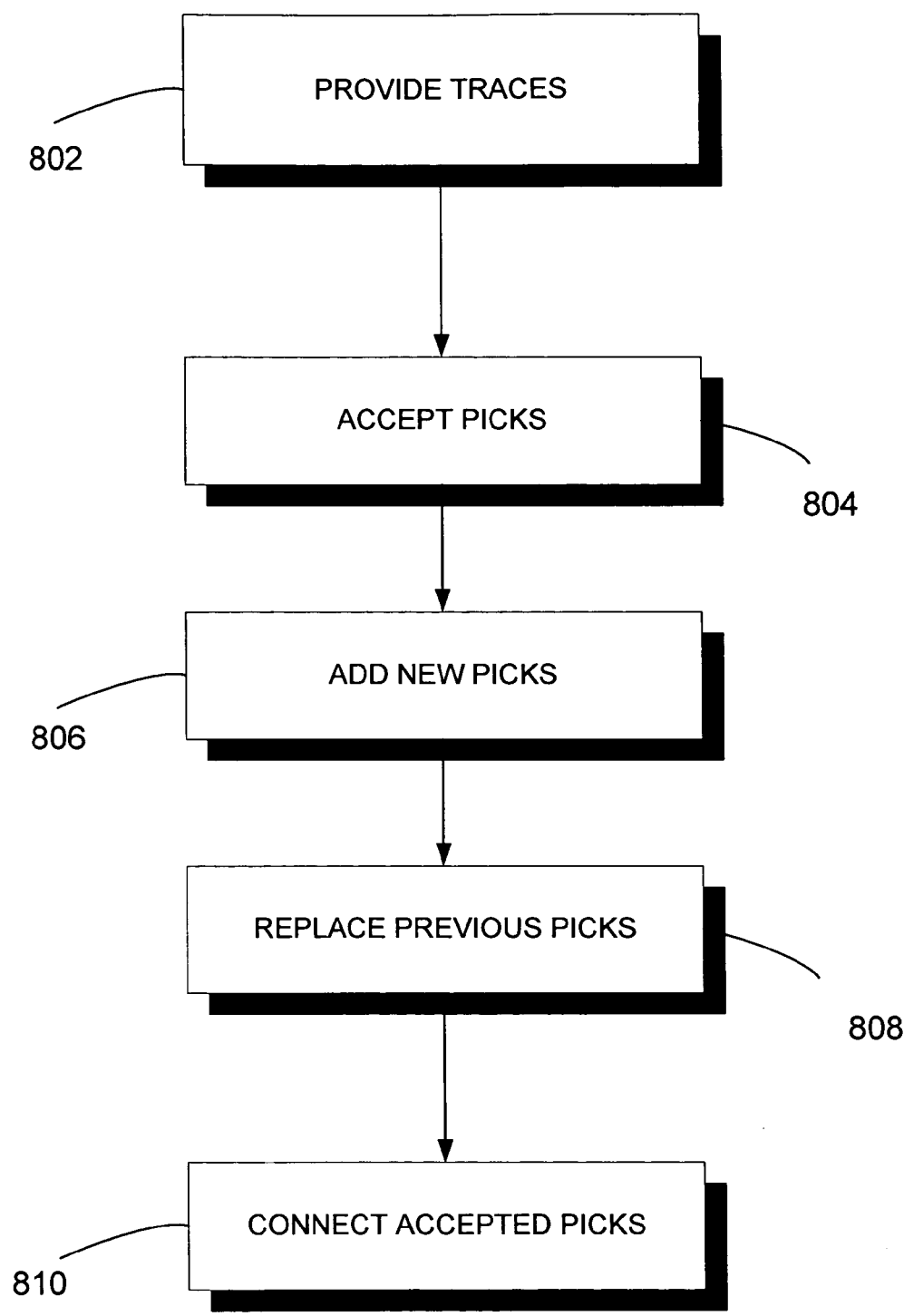
FIG. 8 is a flow diagram showing a method for validating horizon picks in a reverse fault environment in accordance with one embodiment of the present invention.

FIG. 8 provides a method 800 in accordance with the present invention for validating horizon picks in a reverse fault environment. At 802, a plurality of traces are provided for consideration. Each of these traces may have one or more selected z-values. Also, a set of picks associated with a horizon of interest may be included in the selected z-values. At 804, the method 800 accepts a plurality of the picks. As previously discussed, the present invention may utilize any number of pick selection algorithms. For example, as explained previously, the 1-D reverse fault cut detection algorithm maybe appropriate for selecting picks from the z-values.

At 806, new z-values are added to the set of picks. As will be understood by those skilled in the art, the addition of these pending z-values may derive from additional interpretative techniques such as a horizon picking tool. At 808, the method 800 replaces at least a portion of the accepted picks with the newly added z-values.

Figure 9A:
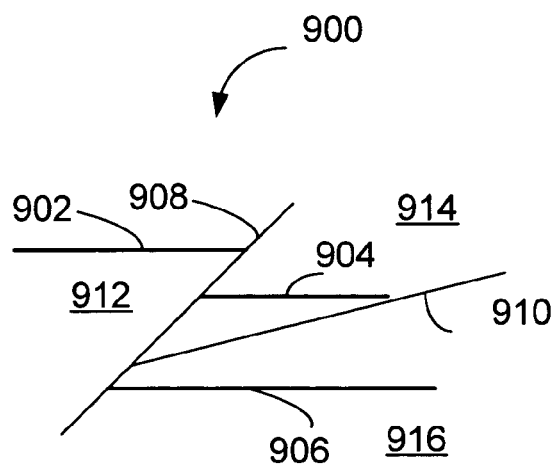
FIGS. 9A–9C are schematic diagrams showing the behavior of one embodiment of the present invention when z-values are added to a pick.
Figure 9B:
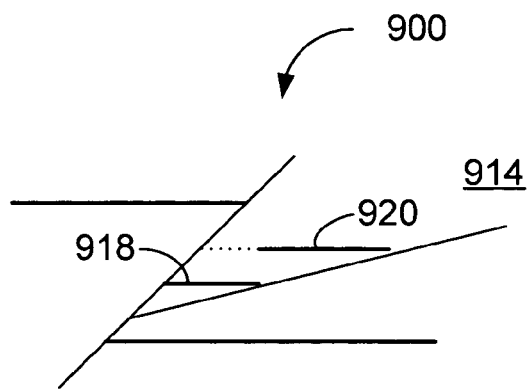
Figure 9C:
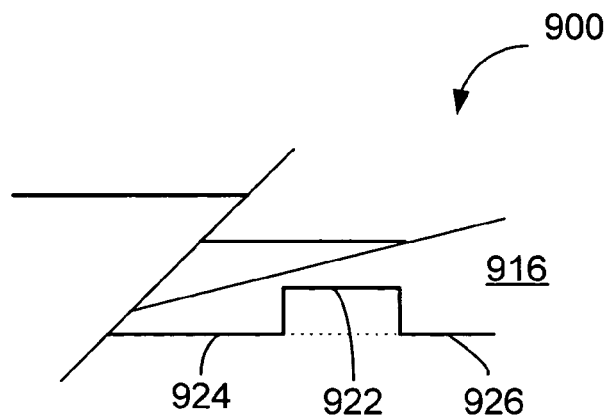

FIGS. 9A–9C, illustrates the behavior of one embodiment of the present invention when z-values are added to a pick. This embodiment assumes that the incoming z-values are correct and replaces any z-values currently within that zone. FIG. 9A shows a plane 900 having a multiple z-valued horizon made up of segments 902, 904, and 906. The plane 900 is separated by reverse faults 908 and 910 and includes zones 912, 914, and 916. FIG. 9B shows plane 900 after z-values are added to zone 914. Segment 918 is composed of the new z-values, while segment 920 retains the originally utilized data. Similarly, FIG. 9C shows the effect of added z-values to zone 916. Segment 922 is composed of the new z-values, while segments 924 and 926 utilize the original data. To carry out this selection behavior, any number of algorithms or techniques may be utilized. For example, all pending z-values may be copied into an empty output pick. This assures that all pending z-values are added to the pick. Then, for each z-value in the current pick, if the value does not collide with any pending z-value (i.e. does not occupy the same cut-zone), this z-value is added to the output pick.

Those skilled in the art will appreciate that an emergent feature of the multiple z-value implementations may be a built-in undo feature. Since the 1-D cut rule can be applied in memory, the pick within the multiple z-value version of the file is not changed until that pick is explicitly changed (re-picked) by the user. For an example, if the fault segments are re-picked in the same location, the original picks will reappear because the pick was never actually changed on disk—with the fault segments back in place, the original z-values are once again valid.

Returning to FIG. 8, at 810, the method 800 connects the accepted picks, including the newly added z-values. As will be appreciated by those skilled in the art, such connections may be made in accordance with a variety of connectivity algorithms. For example, the discussed previously algorithms are acceptable for use with the method 800.

Figure 10:
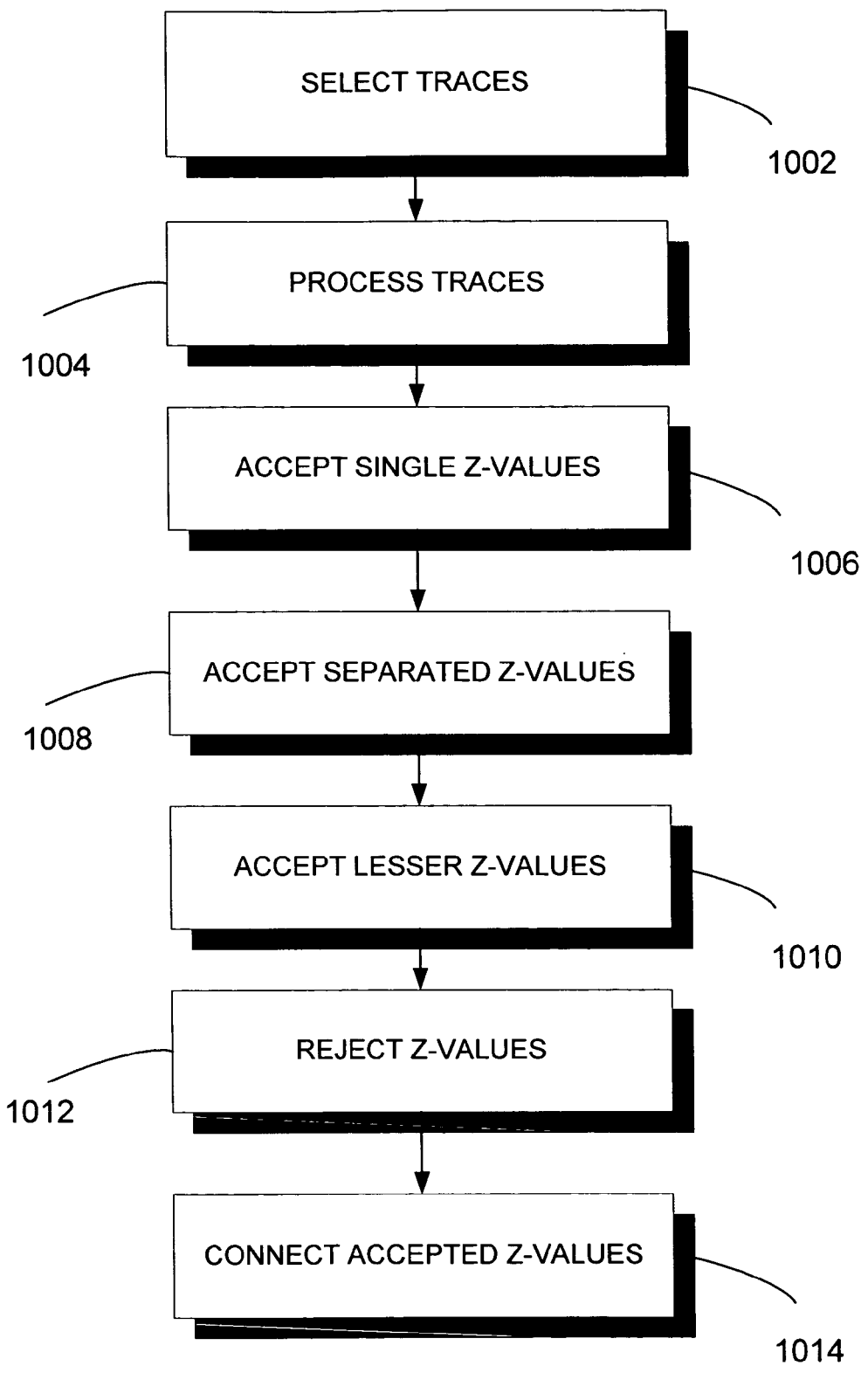
FIG. 10 is a flow diagram showing a method for validating horizon picks in accordance with one embodiment of the present invention.

FIG. 10 shows a method 1000 for validating horizon picks according to the present invention. The method 1000 is preferably performed with respect to a plurality of z-values separated by one or more reverse faults. At 1002, the method 1000 selects seismic traces having one or more selected z-values. As will be understood by those skilled in the art, such selected z-values may correspond to a horizon of interest.

At 1004, the seismic traces are processed to determine the number of z-values associated with each trace. For traces with only one associated z-value, these z-values are accepted at 1006.

When a trace has more than one z-value, method 1000 provides various steps to determine which values should be accepted and which should be rejected. Those skilled in the art will recognize these steps as 1-D cut enforcement rules similar to those previously discussed. At 1008, the method 1000 accepts each z-value on a trace that is separated from another z-value on the trace by a reverse fault. For cases in which the z-values are not separated by reverse faults, steps 1010 and 1012 provide the rules of acceptance and rejection. At 1010, the method 1000 accepts the shallowest (or smallest) z-value that is not separated from another z-value by a reverse fault. Similarly, at 1012, the method 1000 rejects the deepest (or greatest) z-value that is not separated from another z-value by a reverse fault. Hence, no two accepted z-values on a single trace will exist in the same fault zone.

Those skilled in the art will recognize that selection of the shallowest z-values is provided as an example and that the present invention could also select the deepest z-values while rejecting the more shallow.

At 1014, the method 1000 connects the accepted picks. As will be appreciated by those skilled in the art, the connections should not intercept the reverse faults and the connections may be made in accordance with a variety of connectivity algorithms.

Figure 11:
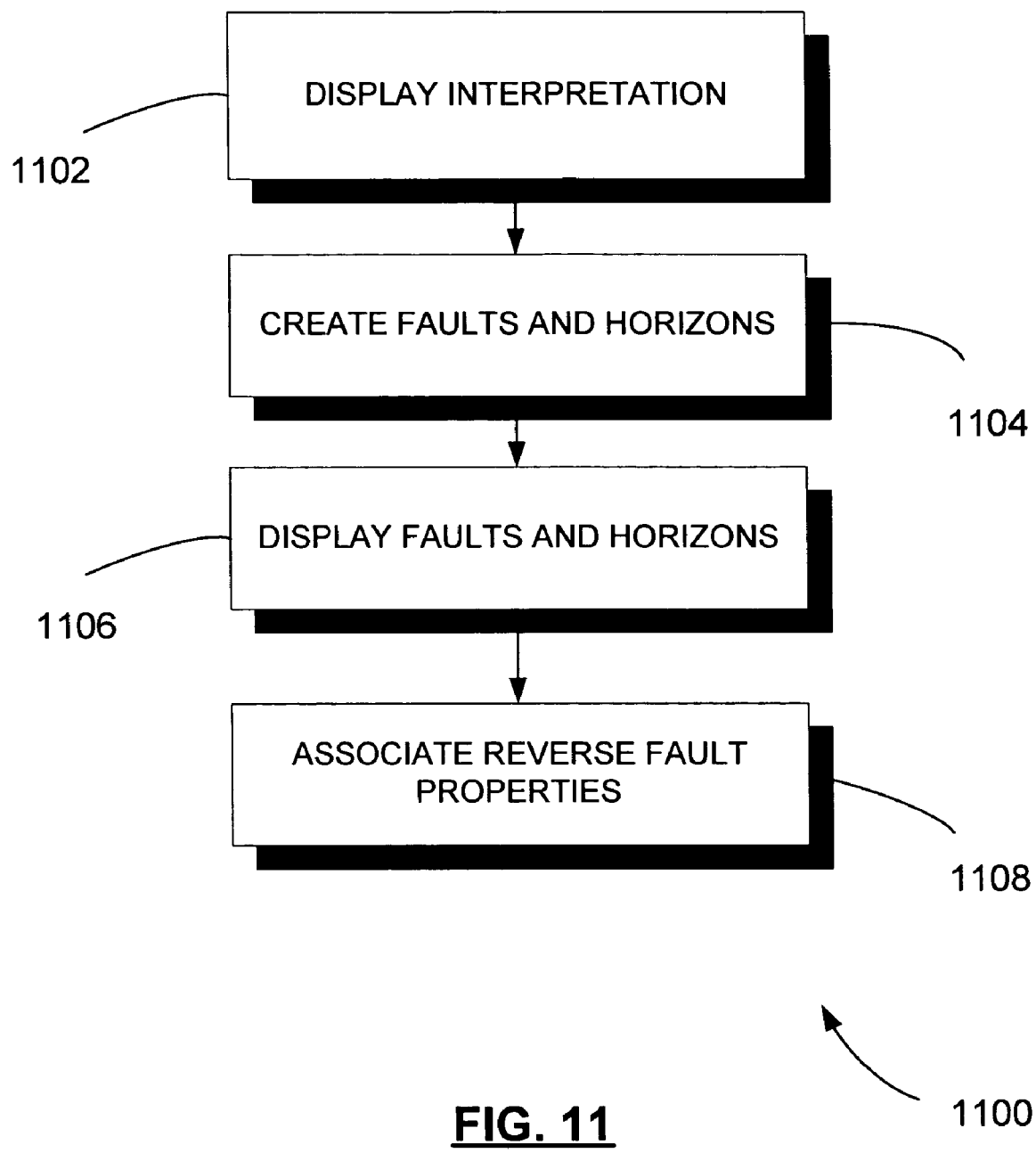
FIG. 11 is a flow diagram showing a method for allowing a user to interpret seismic data depicting a reverse-fault environment in accordance with one embodiment of the present invention.

FIG. 11 shows a method 1100 for allowing a user to interpret seismic data depicting a reverse-fault environment. At 1102, the method 1100 displays an interpretation of seismic data. As will be understood by those skilled in the art, such a display may be provided by any number of well-known techniques and platforms. As previously discussed, methods for obtaining, presenting, and interpreting seismic data on a computer are well known in the art.

At 1104, reverse faults and multiple z-valued horizons are created within the interpretation, and, at 1106, the faults and horizons are displayed to the user. Such faults and horizons are well known in the art, and any number of platforms or interfaces may be utilized to create and display these features. For example, a user may identify a reverse fault in the interpretation and may use a pick mode to draw the segments of the fault. Once created, the faults may be edited or removed. To create horizons, a horizon and picking mode may be selected. Once in a pick mode, the horizon may be interpreted. As will be understood by those skilled in the art, any number of segments may be added to the horizon via such picking.

At 1108, a set of reverse-fault environment properties is associated with the created faults and horizons. As previously discussed, reverse faults have unique geometries and terminology. Those skilled in the art will recognize that any number of reverse-fault environment properties is acceptable for use with the present invention. For example, the previously discussed 1-D cut rule and 2-D connectivity algorithm are acceptable properties to apply as part of method 1100. By utilizing properties such of these, the method 1100 may be configured to enable the display of more than one z-value per trace in a single z-valued map view. Those skilled in the art will appreciate that many horizon operations can work with multiple z-valued horizons, and, method 1100 may provide a mechanism for extracting the pertinent single z-valued view from the multi z-valued horizons.

The method 1100, at 1108, may also be configured to associated properties such as a fault constrained method in which multiple z-valued horizons may be picked in conjunction with reverse faults (or unassigned fault segments). This method may utilize a 1-D fault cut separation rule- if any trace has multiple z-values, the values must be separated temporally by reverse fault cuts. As will be understood by those skilled in the art, this constraint permits users to pick horizons on any set of seismic trace or z-value pairs that are in contiguous zones (i.e. do not cross reverse fault boundaries). Furthermore, extensions to two and three dimensions follow from this 1-D fault cut separation rule.

Optionally, step 1108 may associate a variety of entities with an interpretation of a reverse fault. For example, these entities may be the multi z-valued horizon, the reverse fault, fault polylines, and the fault blocks. Such structures are well known in the art. According to one embodiment, the multi z-valued horizon is just a standard horizon with a multiple z-valued functionality enabled.

Figure 12A:
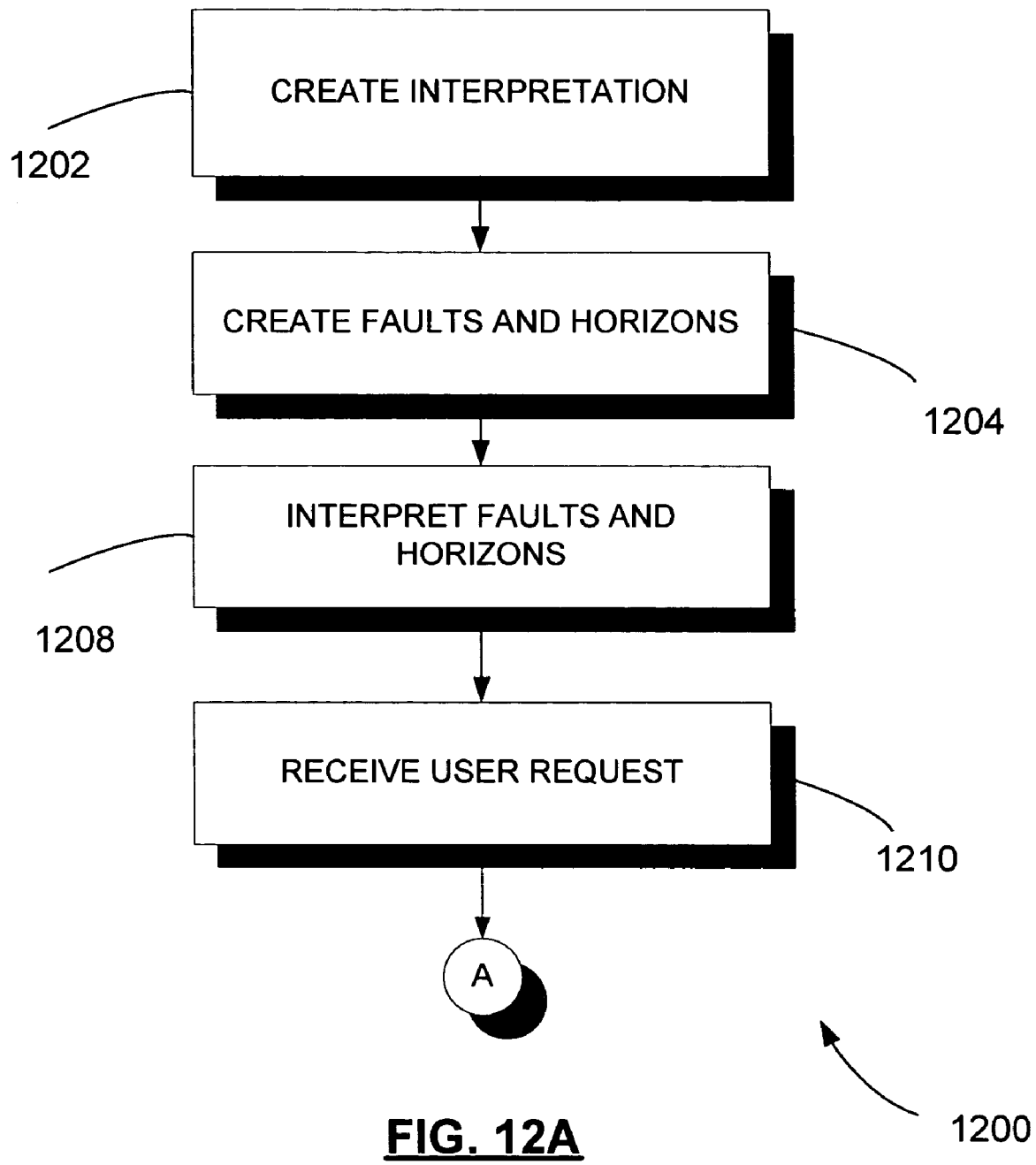
FIGS. 12A–12B are a flow diagram showing a method for allowing a user to interpret seismic data in a reverse-fault environment in accordance with one embodiment of the present invention.
Figure 12B:
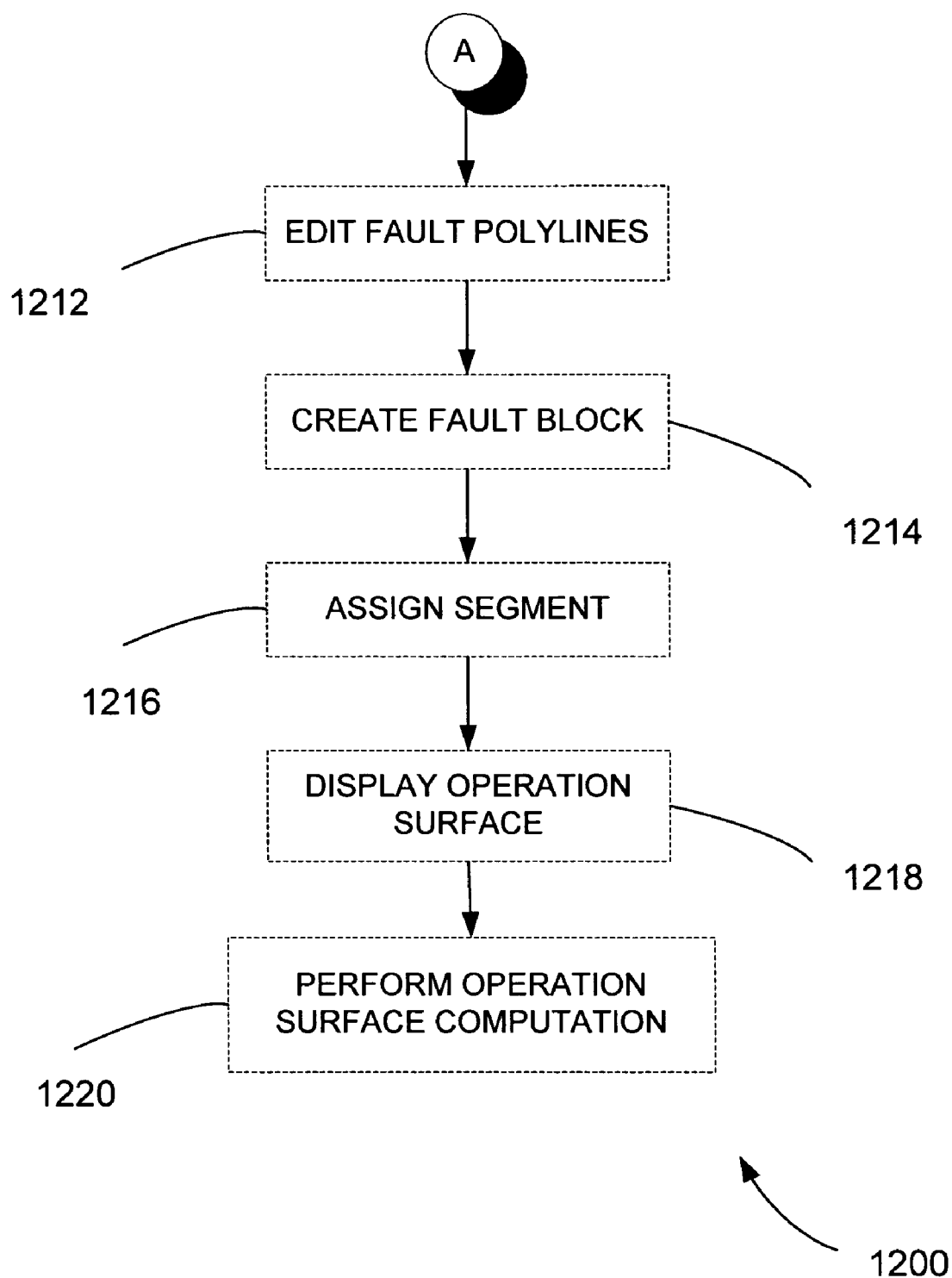

FIGS. 12A and 12B shows a method 1200 for allowing a user to interpret seismic data in a reverse-fault environment. On FIG. 12A, at 1202, the method 1200 creates an interpretation of seismic data. As will be understood by those skilled in the art, such an interpretation may be provided by any number of well-known techniques and platforms in the art.

At 1204, reverse faults and multiple z-valued horizons are created within the interpretation. Such faults and horizons are well-known in the art, and any number of platforms or interfaces may be utilized to create and display these features. At 1206, the method 1200 interprets the faults and horizons. According to one embodiment of the present invention, such interpretation utilizes the previously discussed 1-D cut rule and 2-D connectivity algorithm. However, any number of interpretive techniques that are appropriate for reverse fault environments may be utilized with the present invention.

At 1208, method 1200 receives a user input indicating a user's desire to perform one or more interpretive operations with respect to the faults and horizons. Examples of such operations are presented on FIG. 12B. For instance, at 1210, the proper structures for reverse fault polylines may be associated with the reverse fault and edited. As will be understood by those skilled in the art, fault polylines are the multiple z-value counterparts to normal fault polygons. These polylines are composed of two lines, a hanging wall line and a footwall line. Barbs may be drawn from the hanging wall to indicate the direction to the footwall line. To edit the polylines, any number of desired manipulates may be received from a user and performed upon the interpretation. The present invention may also include support for the manual creation and editing of reverse fault polylines. The interface providing this support may allow that the hanging wall and footwall lines to be manipulated separately.

At 1212, fault blocks may be created and/or managed. A fault manager dialog may be provided for such management. This interface may allow a block to be given a name and, optionally, a color. Also bounding faults may be assigned.

At 1214, the method 1200 may provide for the assignment of a reverse fault horizon segment to a fault block. Such assignment may be accomplished automatically or manually. The method 1200 may also include mechanisms for fault segment extensions. An extension is a dashed line that extends from the last segment point to the edge of view. Its position may be determined from a linear interpolation of the last view point and a projection of where the closest off section point would lie. The 1-D fault cut rule may treat this extension as a valid segment. As will be understood by those skilled in the art, these extensions will also find value for normal faults and legacy interpretations.

According to one embodiment of the present invention, fault block segments are drawn like horizons in a thin, user specified color. These segments are static, that is, re-picking is not allowed. Furthermore, these segments may be recognized by tool tips; when activated, the tip window will display the fault block's name and its parent horizon. Since a newly created fault block segment will overlap with a current horizon, both the horizon and the fault block may be indicated in the tip window.

At 1216, the method 1200 may provide a user the ability to select an operation surface for display. Similarly, at 1218, the method 1200 may perform a single z-valued computation on an operation surface in response to a user input. As previously discussed, the present invention may include functionality to retrieve requested views of seismic features. Such functionality is well known in the art. In the case of reverse faults, for example, the method 1200 may retrieve single z-valued views of multi z-valued horizons components and manage fault blocks associated with faults. For instance, if a "Foot Wall Item" is selected, the deepest z-value from each trace will be displayed in a map. The map view's color bar may be automatically updated to reflect the extreme values of each view, and selecting a fault block may display all the fault block segments associated with the selected horizon. Those skilled in the art will recognize that the operations shown on FIG. 12B are provided as an example and that any number of features may be provided along with the present invention. Hence, any number of workflows and interpretive techniques may be practiced in accordance with the present invention.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A platform for interpretation of seismic data embodied on one or more computer-readable media and executable on a computer, said platform comprising:
   a user input module for accepting user inputs related to interpretation of a set of seismic data;
   a graphics processing module for displaying graphics related to said set of seismic data to a user; and
   a reverse fault module for enforcing a set of rules governing acceptable multiple z-value horizon picks containing a plurality of z-values separated by one or more reverse faults, wherein said set of rules permits a multiple z-value horizon to be interpreted as a single horizon and includes one or more rules for validation of a horizon by accepting one or more selected z-values for said multiple z-value horizon, the accepted z-values including a plurality of picks separated from each other selected z-value on a shared trace by at least one of said one or more reverse faults.

2. The platform of claim 1, wherein said user input module accepts inputs to load said set of seismic data.

3. The platform of claim 1, wherein said user input module accepts inputs to create one or more reverse faults or one or more multiple z-value horizons.

4. The platform of claim 1, wherein said user input module accepts inputs requesting a reverse fault interpretation or a multiple z-value horizon interpretation.

5. The platform of claim 1, wherein said graphics processing module displays at least one of said one or more reverse faults, said multiple z-value horizon and a fault polyline.

6. The platform of claim 1, wherein said graphics processing module translates inputs into interpretation requests.

7. The platform of claim 1, further comprising a data management module for loading of at least a portion of said set of seismic data from a memory location.

8. The platform of claim 7, wherein said data management module creates at least one reverse fault data object or at least one multiple z-value horizon data object.

9. The platform of claim 1, further comprising an operations surface module for loading one or more single z-value views of a multiple z-value horizon.

10. The platform of claim 9, wherein said operations surface module manages one or more fault blocks associated with said one or more reverse faults.

11. The platform of claim 1, wherein said reverse fault module validates at least one of said one or more reverse faults, said multiple z-value horizon, and a fault polyline.

12. The platform of claim 1, wherein said reverse fault module determines an orientation for one or more fault polylines.

13. The platform of claim 1, wherein said reverse fault module associates a set of reverse-fault environment properties with at least one of said one or more reverse faults and said multiple z-value horizon.

14. The platform of claim 1, wherein said validation rules include connecting a plurality of said accepted z-values, wherein the connections do not intersect said one or more reverse faults.

15. A platform for interpretation of seismic data embodied on one or more computer-readable media and executable on a computer, said platform comprising:
   a user input module for accepting user inputs related to interpretation of a set of seismic data, a reverse fault or a multiple z-value horizon;
   an operations surface module for providing one or more single z-value views of said multiple z-value horizon;
   a graphics processing module for displaying graphics related to said set of seismic data to a user; and
   a reverse fault module for enforcing a set of rules governing acceptable multiple z-value horizon picks containing a plurality of z-values separated by one or more reverse faults, wherein said set of rules allows a multiple z-value horizon to be interpreted as a single horizon and includes one or more rules for validation of a horizon by accepting one or more selected z-values for said multiple z-value horizon, the accepted z-values including a plurality of picks separated from each other selected z-value on a shared trace by at least one of said one or more reverse faults.

16. The platform of claim 15, wherein said validation rules include connecting a plurality of said accepted picks, wherein the connections do not intersect said one or more reverse faults.

17. A method for validation of a horizon containing a plurality of z-values separated by one or more reverse faults, which can be used to interpret the horizon as a single horizon, said method comprising:
   providing a plurality of seismic traces, wherein at least a portion of said seismic traces have one or more selected z-values;
   accepting a plurality of picks from said one or more selected z-values, wherein the accepted picks include picks separated from each other selected z-value on a shared trace by at least one of said one or more reverse faults;
   connecting a plurality of said accepted picks, wherein said connections do not intersect said one or more reverse faults; and
   displaying the connection of said plurality of said accepted picks.

18. The method of claim 17, wherein at least a portion of said one or more selected z-values are associated with said horizon.

19. The method of claim 17, further comprising calculating each of said one or more reverse faults.

20. The method of claim 17, further comprising dividing one or more of said plurality of seismic traces into one or more fault cut zones.

21. The method of claim 20, wherein accepting said plurality of picks includes accepting no more than one selected z-value per pick for each of said one or more fault cut zones.

22. The method of claim 20, wherein accepting one or more picks includes accepting the most shallow selected z-value for each of said one or more fault cut zones.

23. The method of claim 20, wherein accepting one or more picks includes accepting the deepest selected z-value for each of said one or more fault cut zones.

24. The method of claim 17, further comprising receiving one or more new z-values, wherein said one or more new z-values are associated with said horizon.

25. The method of claim 24, wherein said one or more new z-values are derived from a horizon picking tool.

26. The method of claim 24, further comprising accepting each of said one or more new z-values.

27. The method of claim 24, further comprising replacing at least a portion of said one or more selected z-values with said one or more new z-values.

28. The method of claim 24, further comprising rejecting said one or more selected z-values which are not separated from one of said one or more new z-values on a trace by at least one of said one or more reverse faults.

29. The method of claim 17, further comprising processing at least a portion of said seismic traces to determine the number of selected z-values associated with said seismic traces.

30. The method of claim 29, wherein accepting one or more picks includes accepting each selected z-value associated with a seismic trace having only one selected z-value.

31. A method for validation of a horizon containing a plurality of z-values separated by one or more reverse faults, said method comprising:
    selecting a plurality of seismic traces, wherein at least a portion of said seismic traces have one or more selected z-values;
    processing at least a portion of said seismic traces to determine the number of z-values associated with said seismic traces;
    accepting each selected z-value associated with a seismic trace having only one selected z-value;
    accepting each selected z-value associated with a seismic trace that is separated from each other selected z-value associated with said seismic trace by at least one of said reverse faults;
    accepting each selected z-value associated with a seismic trace that is not separated from each other selected z-value associated with said seismic trace by at least one of said one or more reverse faults and which is less than each other selected z-value associated with said seismic trace;
    rejecting each selected z-value associated with a seismic trace that is not separated from each other selected z-value associated with said seismic trace by at least one of said one or more reverse faults and which is greater than each other selected z-value associated with said seismic trace;
    connecting a plurality of said accepted z-values, wherein said connections do not intersect said one or more reverse faults; and
    displaying the connection of said plurality of said accepted z-values.

32. The method of claim 31, wherein at least a portion of said one or more selected z-values are associated with said horizon.

33. The method of claim 31, further comprising dividing each of said plurality of seismic traces into one or more fault cut zones.

34. The method of claim 31, further comprising receiving one or more new z-values, wherein said one or more new z-values are associated with said horizon.

35. The method of claim 34, further comprising accepting each of said one or more new z-values.

36. The method of claim 34, further comprising rejecting said one or more accepted z-values which are not separated from one of said one or more new z-values on a trace by at least one of said one or more reverse faults.

37. A method for allowing a user to interpret seismic data in a reverse-fault environment, said method comprising:
    displaying an interpretation of seismic data;
    creating one or more reverse faults or one or more multiple z-value horizons within said interpretation;
    displaying said one or more reverse faults or said one or more multiple z-value horizons within said interpretation;
    enforcing a set of rules governing acceptable multiple z-value horizon picks containing a plurality of z-values separated by said one or more reverse faults, wherein said set of rules permits a multiple z-value horizon to be interpreted as a single horizon and includes one or more rules for validation of a horizon by accepting one or more selected z-values for said multiple z-value horizon, the accepted z-values including a plurality of picks separated from each other selected z-value on a shared trace by at least one of said one or more reverse faults; and
    associating a set of reverse-fault environment properties with at least one of said one or more reverse faults or said one or more multiple z-value horizons.

38. The method of claim 37, further comprising receiving a user input requesting one or more displays of at least one of said set of reverse-fault environment properties.

39. The method of claim 38, further comprising displaying said at least one of said set of reverse-fault environment properties in response to said user input.

40. The method of claim 37, wherein creating said one or more reverse faults includes receiving one or more user inputs indicating one or more segments of said one or more reverse faults.

41. The method of claim 37, wherein creating said multiple z-value horizons includes utilizing a pick mode.

42. The method of claim 37, further comprising extracting a single z-value view from said one or more multiple z-value horizons.

43. The method of claim 37, wherein said set of reverse-fault environment properties includes one or more reverse fault cuts.

44. The method of claim 37, wherein said set of reverse-fault environment properties includes one or more fault polylines.

45. The method of claim 44, wherein said one or more fault polylines include orientation data.

46. The method of claim 44, wherein said one or more fault polylines include one or more segments edited in response to a user input.

47. The method of claim 37, wherein said set of reverse-fault environment properties includes one or more fault blocks.

48. The method of claim 37, wherein said set of reverse-fault environment properties includes one or more fault segment extensions.

49. The method of claim 37, wherein said set of reverse-fault environment properties includes one or more operation surfaces.

50. The method of claim 49, wherein said one or more operation surfaces include a single z-value view of said one or more multiple z-value horizons.

51. A method for allowing a user to interpret seismic data in a reverse-fault environment, said method comprising:
  displaying an interpretation of seismic data;
  creating one or more reverse faults or one or more multiple z-value horizons within said interpretation;
  enforcing a set of rules governing acceptable multiple z-value horizon picks containing a plurality of z-values separated by said one or more reverse faults, wherein said set of rules permits a multiple z-value horizon to be interpreted as a single horizon and includes one or more rules for validation of a horizon by accepting one or more selected z-values for said multiple z-value horizon, the accepted z-values including a plurality of picks separated from each other selected z-value on a shared trace by at least one of said one or more reverse faults;
  associating a set of reverse-fault environment properties with said one or more reverse faults or said one or more multiple z-value horizons;
  receiving a user input requesting a display of at least one of said set of reverse-fault environment properties; and
  receiving a user input requesting a display of one or more views of said reverse-fault environment.

52. The method of claim 51, further comprising displaying at least one of said at least one of said set of reverse-fault environment properties and said one or more views of said reverse fault environment.

53. The method of claim 51, further comprising extracting a single z-value view from said one or more multiple z-value horizons.

54. The method of claim 51, wherein said set of reverse-fault environment properties includes one or more reverse fault cuts.

55. The method of claim 51, wherein said set of reverse-fault environment properties includes one or more fault polylines.

56. The method of claim 51, wherein said set of reverse-fault environment properties includes one or more fault blocks.

57. The method of claim 51, wherein said one or more views of said reverse-fault environment include one or more operation surfaces.

* * * * *